United States Patent [19]

Suzuki

[11] Patent Number: 4,882,738

[45] Date of Patent: Nov. 21, 1989

[54] CLOCK CONTROL SYSTEM

[75] Inventor: Takashi Suzuki, Tokyo, Japan

[73] Assignee: NEC Corporation, Tokyo, Japan

[21] Appl. No.: 211,281

[22] Filed: Jun. 24, 1988

[30] Foreign Application Priority Data

Jun. 25, 1987 [JP] Japan .................................. 62-156492

[51] Int. Cl.⁴ ............................................... H04L 1/00
[52] U.S. Cl. .................................... 375/108; 307/269;
  331/49
[58] Field of Search ................ 375/106, 108; 307/219,
  307/269; 328/61.71; 331/46, 49

[56] References Cited

U.S. PATENT DOCUMENTS

| | | | |
|---|---|---|---|
| 4,229,699 | 10/1980 | Frissell | 307/269 |
| 4,254,492 | 3/1981 | McDermott | 375/108 |
| 4,322,580 | 3/1982 | Khan et al. | 375/108 |
| 4,480,198 | 10/1986 | Gass | 307/219 |
| 4,564,943 | 1/1986 | Collins et al. | 371/28 |
| 4,574,377 | 3/1986 | Miyazaki et al. | 375/108 |

Primary Examiner—Robert L. Griffin
Assistant Examiner—Stephen Chin
Attorney, Agent, or Firm—Foley & Lardner, Schwartz, Jeffery, Schwaab, Mack, Blumenthal & Evans

[57] ABSTRACT

A clock control system includes two clock supply units and two data processing units. Each clock supply unit is capable of supplying clock signals at either of two frequencies. The clock control system allows each data processing unit to be supplied with clock signals of either frequency from either clock supply unit. If one clock supply unit becomes defective, any data processing unit being supplied by that one defective clock supply unit can have its clock supply switched to the non-defective clock supply unit, without having to change the frequency of the non-defective clock supply unit.

4 Claims, 4 Drawing Sheets

CLOCK CONTROL SYSTEM

BACKGROUND OF THE INVENTION

The present invention relates to a clock control system for use in information processing, digital communication processing and the like.

Some computer systems are single processor systems, having only one data processing unit, while others are multi-processor systems, having a plurality of such units. The basic machine cycle for the operation of these systems is determined by a clock (pulse) given from a clock supplying unit. Thus, in each of the systems referred to above, the basic machine cycle for operation is determined by either a clock given from only one clock supplying unit provided for a system or a clock selected from one of plural clock supplying units, one provided for each data processing unit. One such clock supplying unit is provided with a plurality of oscillators generating a clock (pulse) of different frequencies and with a selector for selecting one of these clock trains of different frequencies generated by these plural oscillators. Another clock supplying unit can generate clock signals in different cycles. For details of this type of unit, reference may be made to the specification of the U.S. Pat. No. 4,564,943. These units are used for early trouble-shooting of data processing units.

Trouble in a clock supplying unit in a system having only one such unit may invite system failure, and its consequences increase with the dimensions of the system.

Where a system has a plurality of clock supplying units, trouble in one of these units may also invite system failure, but a subsequent manual switchover to another clock supplying unit can reduce the occurring probability of system failure. However, as the switchover from the faulty clock supplying unit to a specific other clock supplying unit is manually achieved, the operational convenience is adversely affected. If, moreover, both the clock supplying unit and the plurality of oscillators provided for the unit have to be switched, the operation will be made correspondingly more complex.

SUMMARY OF THE INVENTION

An object of the present invention is, therefore, to provide a clock control system free from the above-mentioned disadvantages.

According to one aspect of the invention, there is provided a clock control system equipped with a plurality of data processing units and a plurality of clock supplying units, each matching one or another of the plural data processing units, wherein:

each of said plural clock supplying unit comprises a plurality of clock generating circuits differing from one another in frequency, and
clock selecting means for selecting one of the clock trains from these plural clock generating circuits; and each of said plural data processing units comprises:
unit designating means for designating the plural clock supplying unit from which to receive a clock supply,
clock switchover ordering means for ordering a switchover from a clock train currently in use to another of said clock supplying units, and
selecting/controlling means, responsive to instructions from said unit designating means and said clock switchover ordering means, for selecting and controlling a clock train from said plurality of clock generating means for said clock supplying units.

BRIEF DESCRIPTION OF THE DRAWINGS

Other objects, features and advantages of the present invention will become apparent from the following detailed description when taken in conjunction with the accompanying drawings, in which.

In the figures, the same reference numerals denote respectively the same elements.

DETAILED DESCRIPTION OF THE PREFERRED EMBODIMENT

Figure 1:
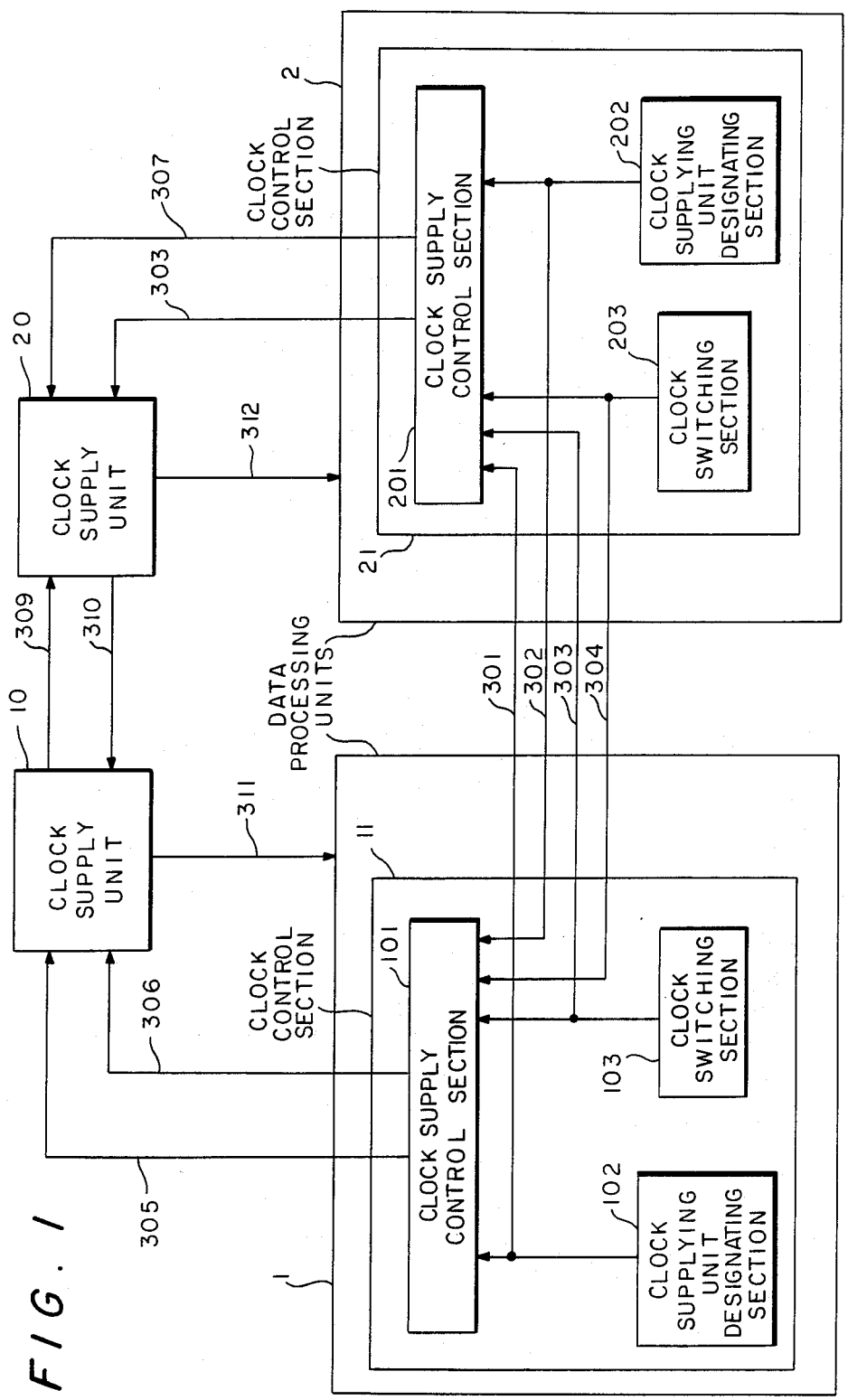
FIG. 1 illustrates a preferred embodiment of the invention.

Referring to FIG. 1, a preferred embodiment of the present invention is provided with a plurality of data processing units 1 and 2 for performing processing operations in accordance with externally supplied clock signals, and a plurality of clock supply units 10 and 20 for varying the mode of clock supply to the data processing units 1 and 2. The plural data processing units 1 and 2 respectively have clock control sections 11 and 21 for controlling alterations in the clock supply from the corresponding clock supplying units 10 and 20. The clock control sections 11 and 21 have clock supplying unit designating sections 102 and 202 for sending out a signal to designate clock supplying unit 10 or 20, whichever the pertinent data processing unit is to receive clock signals from, to clock supplying unit designating lines 301 and 302; clock switching sections 103 and 203 for generating clock switchover ordering signals on clock switching lines 303 and 304; and clock supply control sections 101 and 201 for outputting, on the basis of signals supplied from the clock supplying unit designating sections 102 and 202 and the clock switching sections 103 and 203 via the lines 301 to 304, clock switching unit switchover ordering signals to lines 305 and 307 and clock switchover ordering signals to lines 306 and 308.

Since these clock supply control sections 101 and 201 are similarly structured, the following detailed description will be made with reference to clock supply control section 101 alone.

Figure 2:
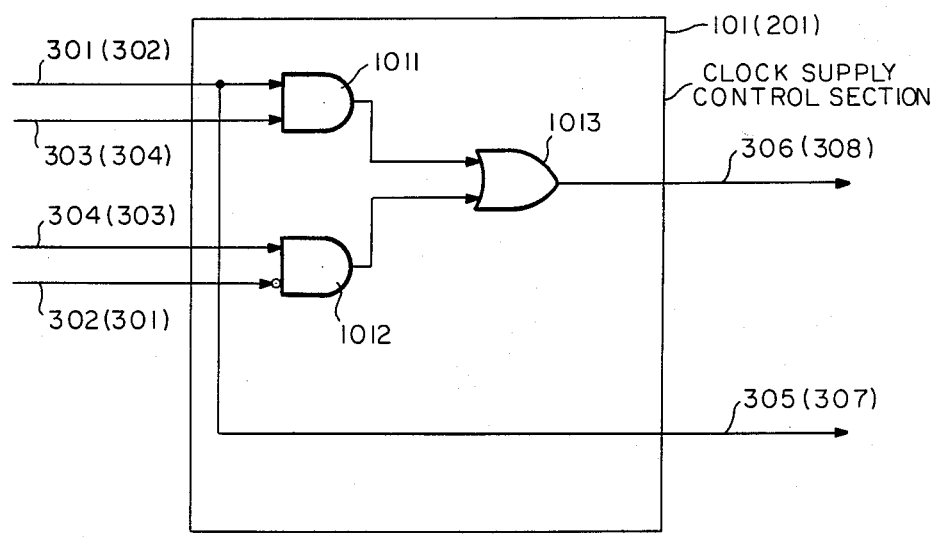
FIG. 2 illustrates a detailed composition of clock supply control sections 101 and 201 of FIG. 1.

Referring now to FIG. 2, the clock supply control section 101 is provided with an AND gate 1011 for controlling the switching of clock signals for data processing unit 1 on the basis of a signal given from the clock supplying unit designating section 102 via the line 301 and another signal given from the clock switching section 103 via the line 303; an AND gate 1012 for controlling the switching of clock signals for data processing unit 2 on the basis of a signal inverted from the signal given from the clock supplying unit designating section 202 via the line 302 and another signal given from the clock switching section 203 via the line 304; and an OR gate 1013 for outputting signals from the gates 1011 and 1012 to the line 306, as clock switchover ordering signals for the clock supplying unit 10. The clock supply control section 101 outputs the signal given via the line 301 as the clock supplying unit switchover ordering signal to the line 305.

The clock supplying unit 10 receiving the inputs of signals from this clock supply control section 101 via the lines 305 and 306 is structured similarly to the clock supplying unit 20. Therefore the detailed description hereunder will refer to the clock supplying unit 10 alone.

Figure 3:
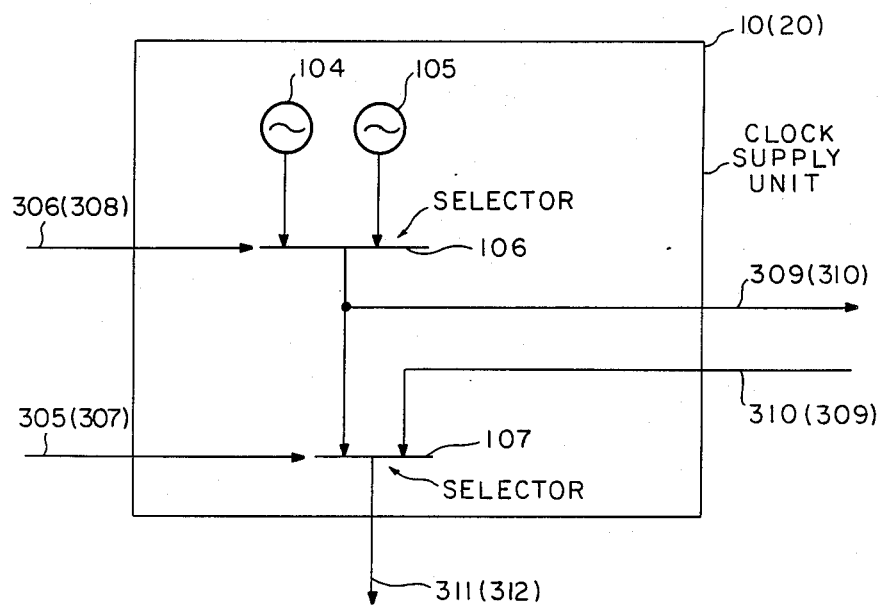
FIG. 3 illustrates a detailed composition of clock supplying units 10 and 20 of FIG. 1.

Referring to FIG. 3, the clock supplying unit 10 comprises a first oscillator 104 for generating clock signals at one frequency, a second oscillator 105 for generating clock signals at a different frequency from the first oscillator 104, a selector 106 responsive to the clock switchover ordering signal given from the clock supply control section 101 via the line 306 for selecting either the clock signals from the first oscillator 104 or those from the second oscillator 105, and another selector 107 responsive to the clock supplying unit switchover ordering signal given from the clock supply control unit 101 via the line 305 for selecting the output of the selector 106 via a line 309 or clock signals given from the other clock supplying unit 20 via a line 310 and outputting clock signals to a line 311.

Next will be described the operation of the preferred embodiment of the present invention in detail with reference to FIGS. 1 and 5.

First will be described in detail the operation to designate a clock supplying unit.

Figure 4:
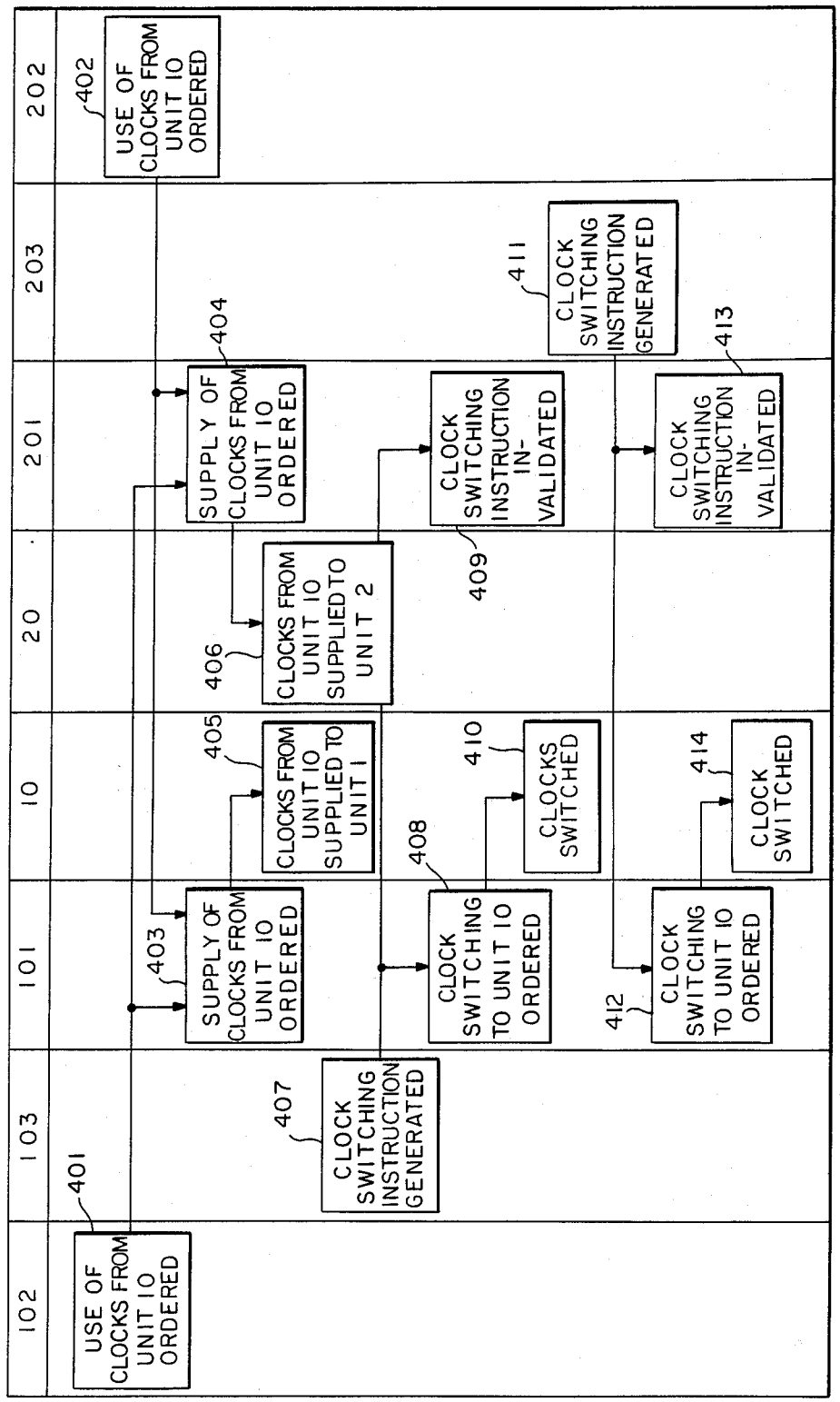
FIGS. 4 and 5 are diagrams for explaining the operation of the preferred embodiment of the present invention.

Referring to FIGS. 1 and 4, at processing step 401 the clock supplying unit designating section 102 of the data processing unit 1 orders the use of the clock signals from the clock supplying unit 10, and outputs a signal to that effect to the line 301. At processing step 402, the clock supplying unit designating section 202 of the data processing unit 2 orders the use of the clock signals from the clock supplying unit 10, and outputs a signal to that effect to the line 302.

Referring now to FIGS. 1, 2 and 4, at processing step 403, the clock supply control section 101, responding to a signal given via the line 301, sends out to the line 305 a signal ordering the supply of clock signals from the clock supplying unit 10.

Referring to FIGS. 1, 3 and 4, at processing step 405, the selector 107 of the clock supplying unit 10 selects the output of the selector 106 in response to a signal from the line 305, and supplies it to the data processing unit 1 via the line 311 as the clock signals for its use.

Referring to FIGS. 1, 2 and 4, at processing step 404, the clock supply control section 201, responding to a signal given via the line 302, sends out to the line 307 a signal ordering the supply of clock signals from the clock supplying unit 10.

Referring to FIGS. 1, 3 and 4, at processing step 406, the selector 107 of the clock supplying unit 20, responding to a signal from the line 307, selects clock signals given from the clock supplying unit 10 via the line 309, and supplies them to the data processing unit 2 by way of a line 312.

Next will be described in detail the clock switching operation of the clock supplying unit 10 responding to an order from the clock switching section 103 of the data processing unit 1.

Referring to FIGS. 1 and 4, at processing step 407, the clock switching section 103 of the data processing unit 1 generates, and sends out to the line 303, a clock switchover ordering signal.

Referring now to FIGS. 1, 2 and 4, at processing step 408, the gate 1011 of the clock supply control section 101, responding to signals from the lines 301 and 303, generates a clock switching effective signal for the unit it belongs to, transmits the signal via the gate 1013 and the line 306, and supplies it to the clock supplying unit 10 as the clock switchover ordering signal.

Referring to FIGS. 1, 3 and 4, at processing step 410, the selector 106 of the clock supplying unit 10, responding to the switchover ordering signal from the line 306, switches over the choice from the output of the first oscillator 104 to that of the second oscillator 105 or vice versa. The output of the selector 106 is transmitted via the line 309 to the second clock supplying unit 20 and, at the same time, is supplied to the data processing unit 1 via the selector 107 and the line 311.

Referring to FIGS. 1, 2 and 4, at processing step 409, the gate 1012 of the clock supply control section 201 of the data processing unit 2 invalidates the clock switchover ordering signal, given via the line 303, by the negative logic of the unit designating signal given via the line 301. Therefore, the clock supply control section 201 gives no clock switching instruction to the clock supplying unit 20.

In this state, since clock signals are supplied from the clock supplying unit 10 to the data processing units 1 and 2, the clock cycles of both data processing units 1 and 2 are changed by a clock switching operation.

Now will be described in detail the clock switching operation of the clock supplying unit 10 at the instruction of the clock switching section 203 of the data processing unit 2.

Referring to FIGS. 1 and 4, at processing step 411, the clock switching section 203 of the data processing unit 2 generates, and sends out to the line 304, a clock switchover ordering signal.

Referring to FIGS. 1, 2 and 4, at processing step 412, the gate 1012 of the clock control section 101 of the data processing unit 1 validates the clock switchover ordering signal, given via the line 304, by the negative logic of the unit designating signal given via the line 302. The validated signal is given to the clock supplying unit 10 as the switchover ordering signal via the gate 1013 and the line 306. Next at processing step 414, the clock supplying unit 10 performs the same clock switching operation as at processing step 410.

At processing step 413, the gate 1011 of the clock control section 201 of the data processing unit 2 invalidates the clock switchover ordering signals, given via the line 304, with the unit designating signal given via the line 302. Therefore, the clock control section 201 gives no clock switchover ordering signal to the clock supplying unit 20.

In this state too, since clock signals are supplied from the clock supplying unit 10 to the data processing units 1 and 2, the clock cycles of both data processing units 1 and 2 are changed by a clock switching operation.

Under the present invention described with reference to FIG. 4, when clock signals are supplied from the clock supplying unit 10, a clock switching instruction from either data processing unit, 1 or 2, can switch the clock signals from only the clock supplying unit which currently is supplying clock signals to the processing unit.

Next will be explained in detail that, even when a data processing unit is receiving clock supply from the other clock supplying unit, clock signals from only the other clock supplying unit which currently is supplying clock signals to the processing unit can be switched.

First will be described a state in which the data processing units 1 and 2 receive clock signals from the clock supplying units 20 and 10, respectively.

Figure 5:
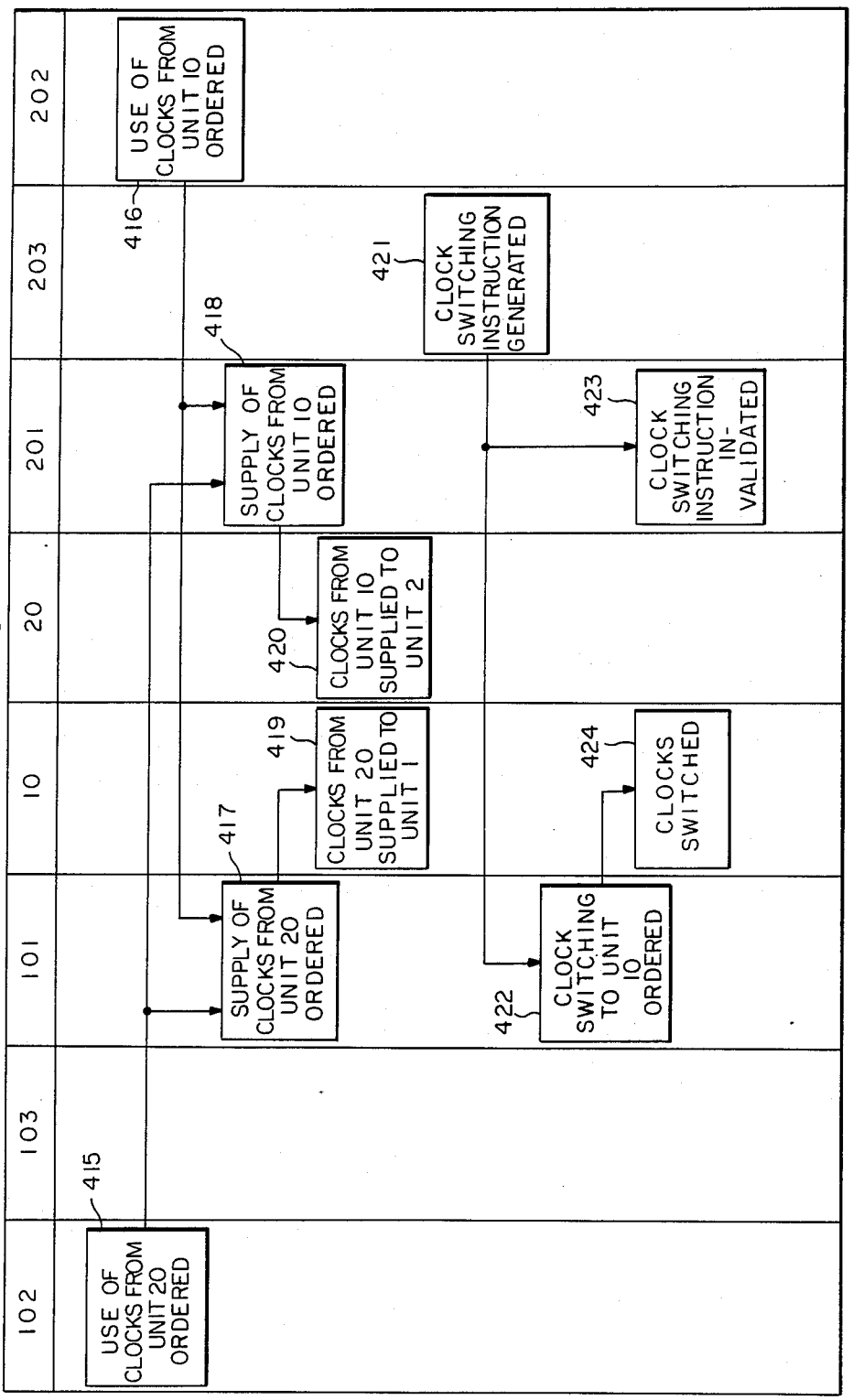

Referring to FIGS. 1 and 5, at processing step 415, the clock supplying unit switching section 102 of the data processing unit 1 outputs a unit designating signal to the line 301 to receive clock signals from the clock supplying unit 20. Further at processing step 416, the clock supplying unit switching section 202 of the data processing unit 2 outputs a unit designating signal to the line 302 to receive clock signals from the clock supplying unit 10.

Referring to FIGS. 1, 2 and 5, at processing step 417, the clock control section 101 of the data processing unit 1 supplies the clock supplying unit 10 via the line 305 with the clock supplying unit 20 designating signal given via the line 301 as the signal to order designation of the unit 20. Further at processing step 418, the clock control section 201 of the data processing unit 2 supplies the clock supplying unit 20 via the line 307 with the clock supplying unit 10 designating signal given via the line 302 as the signal to order designation of the unit 10.

Referring to FIGS. 1, 3 and 5, at processing step 419, the selector 107 of the clock supplying unit 10 selects, and supplies the data processing unit 1 via the line 311 with, the clock signals given from the clock supplying unit 20 via the line 310. Further at processing step 420, the selector 107 of the clock supplying unit 20 selects, and supplies the data processing unit 2 via the line 312 with the clock signals given from the clock supplying unit 10 via the line 309.

In this manner, the data processing unit 2 receives clock signals from the clock supplying unit 10. Therefore, when it is desired to change the clock cycle for the data processing unit 2, a clock switching instruction should be given to the clock supplying unit 10 alone. This operation will be described below.

Referring to FIGS. 1 and 5, at processing step 421, the clock switching section 103 outputs a clock switchover ordering signal to the line 304.

Referring to FIGS. 1, 2 and 5, at processing step 423, the gate 1011 of the clock supply control section 201 invalidates the clock switchover ordering signal, given via the line 304, with the unit designating signal given via the line 302. Therefore, the clock control section 201 gives no clock switchover instruction to the clock supplying unit 20 via the line 308.

At processing step 422, the gate 1012 of the clock supply control section 101 generates from the clock switchover ordering signal, given via the line 304, a clock switchover ordering signal for the clock supply unit 10 by the negative logic of the unit designating signal given via the line 302. This signal is given to the clock supplying unit 10 as the clock switchover ordering signal via the gate 1013 and the line 306.

Referring to FIGS. 1, 3 and 5, at processing step 424, the selector 106 of the clock supplying unit 10, responding to the switchover ordering signal given via the line 306, switches over the choice from the output of the first oscillator 104 to that of the second oscillator 105 or vice versa. The output of the selector 106 is supplied via the line 309, the second clock supplying unit 20 and the line 312 to the data processing unit 2.

In this manner, when the data processing unit 2 is receiving clock signals from the clock supplying unit 10 which does not correspond to the processing unit 2, the clock train from the clock supplying unit 10, which is currently supplied to the processing unit, can be switched to another clock train. This makes it possible to operate the data processing system independent of the mode of clock supply, and to improve the efficiency of system operation, resulting in the further advantage of simplifying remote maintenance and operation.

Thus, by making a clock supply controllable, the system keeps unchanged the state of clock supply even if the clock supplying unit is switched owing to an oscillator trouble or the like in the clock supplying unit, so that the state of clock supply need not be reset. Further the system makes it unnecessary, in switching the clock supply, to be conscious of the relationship between the clock supplying unit and the data processing unit, and only the data processing unit has to be taken account of, resulting in additional improvement of operational efficiency. Moreover, if the clock trains supplied by two clock supplying units are made different from each other unlike in the above described embodiment of the invention wherein they are identical, the variety of clock supply modes will be doubled to provide effective means for failure margin tests of clock signals for early trouble-shooting in system maintenance.

What is claimed is:

1. A clock control system comprising:
a plurality of data processing units, and
a plurality of clock supplying units,
each of said clock supplying units comprising:
a plurality of clock generating means for generating a plurality of clock signals differing from one another in frequency, and
clock selecting means for selecting a clock signal from either said plurality of clock signals or from a second clock supplying unit; and
each of said data processing units comprising:
unit designating means for designating a clock supplying unit from which to receive a clock signal,
clock switchover ordering means for ordering a switchover from a clock signal currently in use to another of said plurality of clock signals, and
selecting/controlling means, responsive to instructions from said unit designating means and from said clock switchover ordering means, for selecting and controlling one of said plurality of clock generating means.

2. A clock control system, comprising:
a first clock supply circuit generating a first clock signal of a first type and a second clock signal of a second type;
a second clock supply circuit generating a third clock signal of said first type and a fourth clock signal of said second type, said first and said second clock supply circuits being electrically connected to one another;
a first data processing unit electrically connected to said first clock supply circuit, said first data processing unit including:
a first clock signal type switching circuit, said first clock signal type switching circuit outputting mode signals which designate whether a clock signal supplied to said first data processing unit is of said first type or of said second type; and
a first supply designating circuit, said first supply designating circuit outputting supply source signals which designate whether said clock signal supplied to said first data processing unit is either one of said first or second clock signals or one of said third or fourth clock signals; and a second data processing unit electrically connected to said second clock supply circuit, said second data processing unit including:

a second clock signal type switching circuit, said second clock signal type switching circuit outputting mode signals which designate whether a clock signal supplied to said second data processing unit is of said first type or of said second type; and a second supply designating circuit, said second supply designating circuit outputting supply source signals which designate whether said clock signal supplied to said second data processing unit is either one of said first or second clock signals or one of said third or fourth clock signals.

3. A clock control system as set forth in claim 2 above, wherein said first type signal has one frequency and said second type signal has a frequency different from the frequency of said first type signal.

4. A clock control system as set forth in claim 2 above, further comprising:

a first selector as part of said first clock supply circuit, said first selector selecting either one of said first and second signals or one of said third and fourth signals as said clock signal supplied to said first data processing unit; and a second selector as part of said second clock supply circuit, said second selector selecting either one of said first and second signals or one of said third and fourth signals as said clock signal supplied to said second data processing unit.

* * * * *